United States Patent
Crawford, Jr.

[11] 3,841,417
[45] Oct. 15, 1974

[54] PLATE BORING DEVICE

[76] Inventor: Lawrence G. Crawford, Jr., 10104 Fernglen Ave., Los Angeles, Calif. 91042

[22] Filed: July 26, 1973

[21] Appl. No.: 382,969

[52] U.S. Cl. .................. 173/31, 173/45, 175/40, 175/394
[51] Int. Cl. ..................... E21c 9/00, E21c 11/00
[58] Field of Search ........... 175/40, 220, 173, 321, 175/394, 323; 173/21, 45, 31–33

[56] References Cited
UNITED STATES PATENTS

| | | | |
|---|---|---|---|
| 699,122 | 4/1902 | Warner | 175/173 |
| 1,478,477 | 12/1923 | Kleystreuber | 175/220 X |
| 1,613,932 | 1/1927 | Cassriel | 175/315 X |
| 2,250,671 | 7/1941 | Joy | 175/257 X |
| 2,312,176 | 2/1943 | Kotowski | 175/403 X |
| 2,488,279 | 11/1949 | Fitzmaurice et al. | 175/220 X |
| 2,964,115 | 12/1960 | Claffelter | 175/40 |
| 2,991,838 | 7/1961 | Lane | 175/220 |
| 3,552,503 | 1/1971 | Lebar | 175/40 |

FOREIGN PATENTS OR APPLICATIONS
311,961  5/1929  Great Britain ........ 175/220

*Primary Examiner*—David H. Brown
*Attorney, Agent, or Firm*—Roger A. Marrs

[57] ABSTRACT

A drill is disclosed herein having a pair of coaxial sleeves enclosing a powered rotary drill. The inner sleeve is provided with an alignment device on its extreme and resting on the work to be drilled and which includes a V shaped notch adapted to index or register with previously installed foundation bolt. The outer sleeve is carried on the drill housing and includes a bushing arranged in sliding relationship to the inner sleeve. An expansion spring is compressed between the bushing and an annular shoulder formed on the inner sleeve so as to normally bias the drill bit away from the work piece.

8 Claims, 4 Drawing Figures

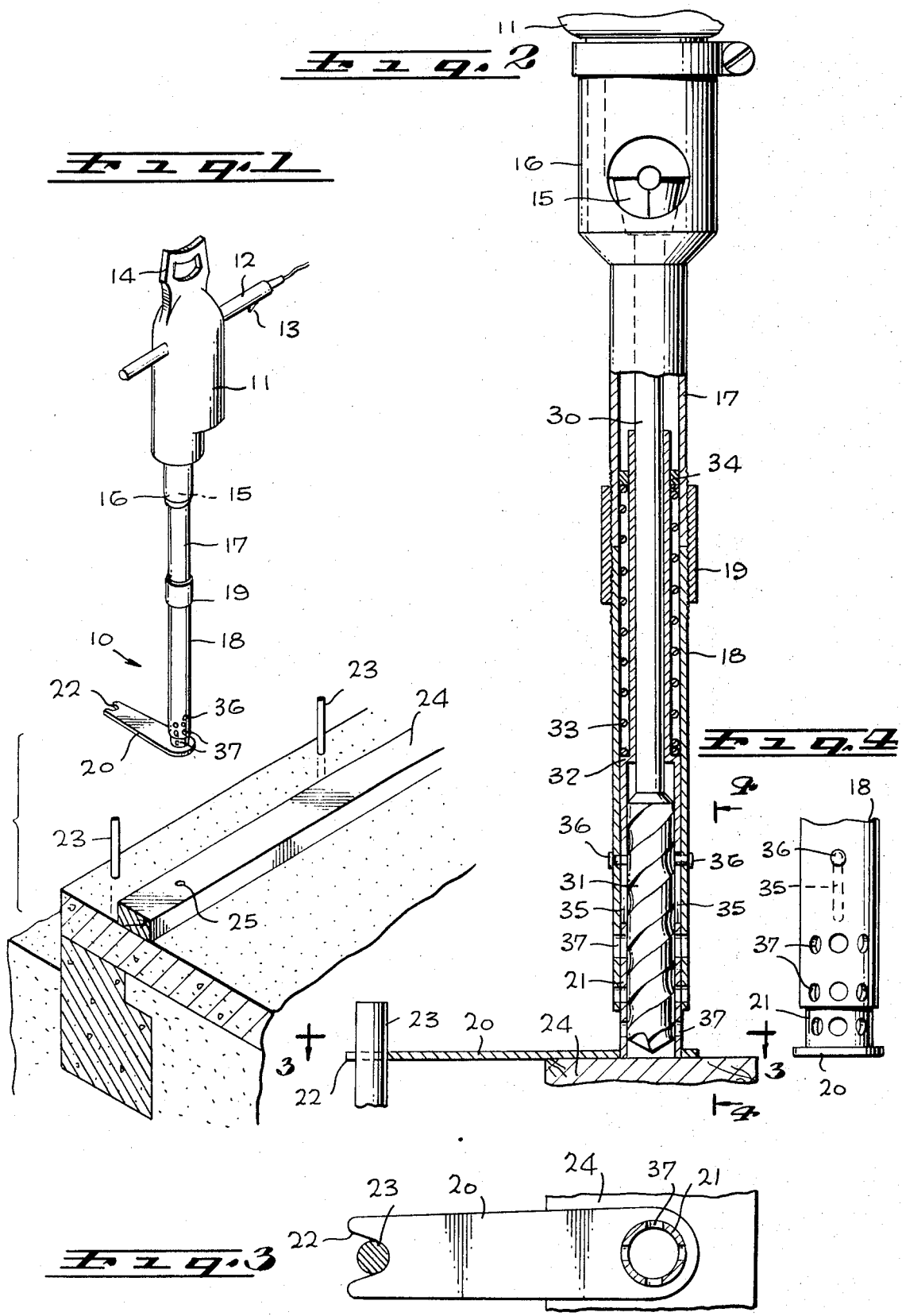

PLATE BORING DEVICE

BACKGROUND OF THE INVENTION

1. Field of the Invention

This invention relates to drilling or boring equipment and more particularly, to a novel drill apparatus having registration means for location of holes intended to be drilled and having means for enclosing the drill bit and resiliently biasing the drill bit away from the work piece.

2. Description of the Prior Art

Drilling, reaming and counterboring are related operations that resemble certain phases of material forming and milling procedures and are employed extensively in a wide variety of applications. The purpose of these procedures is the preparation of holes or borings through the material and, in the case of reaming and counterboring, the preparation of surfaces surrounding and immediately adjacent to previously formed holes. It is standard practice to employ a fluted end-cutting tool, such as a drill bit, to originate or enlarge a hole in solid material and to employ a suitable apparatus for rotating the drill bit which is fed into stationary work or material.

In almost every instance, particularly when the work or material is composed of wood or wood-like substances, the drilling operation is performed with a drilling apparatus comprising a manually operated brace having a drill bit detachably secured thereto by means of a releasable chuck. Most drill bits embody a shank, a body, a neck, a point or a drill guide. In some types of drill bits, the flutes are straight and without helix angle and in some sizes, the drill bit omits the neck. Also, a drill bit may incorporate one or more diameters and one or more groups of cutting elements. In order to insure a tight gripping or clamping securement between the shank of the drill bit and the chuck of the brace, it is conventional practice to form the extreme end of the drill bit shank with a plurality of lands or flat surfaces, usually square in cross-section and generally formed with a declining taper to a reduced thickness at the extreme terminating end of the shank. The tapered shank of the drill bit is fitted directly into a sleeve or jaw segments supported by the brace chuck or in some cases, a collet-type split sleeve, so that when fastened down, a positive drive is effected with the brace.

Drills and braces as previously described have beem employed in the construction industry for many years for forming holes in wooden boards, beams, posts, etc. As long as the material to be drilled does not require deep boring and is of substantially lesser thickness than the length of the bit, no unusual or difficult problems are encountered. However, it is sometimes required, particularly in construction form work, to drill coaxial holes in two or more form boards that are spaced apart so that the combined thickness of the boards through which the drill must progress equals a distance substantially greater than the length of the normal drill bit. Also, because of the thickness of the boards, beams or the like intended to be drilled, employing a hand operated brace represents a relatively time-consuming and laborsome procedure.

In some instances, construction workers have attempted to modify the conventional or standard drill bits as previously described so as to be employable with power turning equipment. It is well known to those skilled in the art that the conventional tapered flat end of a drill bit cannot be readily accommodated into the chuck of a conventional power tool. Such attempts generally take the form of physically sawing through the shank of the drill bit to remove the tapered flats formed thereon so that a smooth and rounded portion of the drill bit shank may be received into the chuck of a power tool. Obviously, these attempts are time-consuming and extremely wasteful inasmuch as the severed portions of the drill bit shanks are thrown away and have no further use. Since drill bits are generally composed of expensive steel or alloys, the initial cost of the drill bit is relatively high when such a specially formed part of the drill bit is removed and discarded. Obviously, since the rounded part of the drill bit is cylindrical, it has a tendency to slip within the chuck of the power equipment or tool and consequently does not afford reliable service.

Also, problems have been encountered when attempting to locate a plurality of holes to be drilled with respect to construction fasteners such as foundation bolts. Generally, these locations are marked by hand and then drilled. This procedure is costly and time consumming.

Therefore, a long standing need has existed to provide a self locating drilling apparatus whereby a plurality of holes may be drilled in a wooden foundation stud or base without the necessity of locating each hole preparatory to the drilling procedure.

SUMMARY OF THE INVENTION

Accordingly, the above difficulties and problems encountered with prior art drill bits and equipment in connection with locating and drilling holes in a foundation strip or base are obviated in accordance with the present invention which provides an elongated drill bit operably carried on a conventional powered drill motor. An outer sleeve is connected to the fixed portion of the housing for the power unit while an inner sleeve is disposed in coaxial relationship within the bore of the other sleeve and includes an extension or alignment piece fixed at one end thereof having a notched end for aligning with a selected foundation bolt. The drill bit extends through the bore of the inner sleeve and is normal biased away from the work piece to be drilled by a resilient means compressed between an annular shoulder formed on the inner sleeve and a bushing fixed to the inside diameter of the outer sleeve. Limit means are provided by a pin and slot arrangement between the pair of sleeves so that the drill can be extended into the wood or work piece to a predetermined depth.

Therefore, it is among the primary objects of the present invention to provide a novel drilling apparatus incorporating a self locating device adapted to corporate with a foundation bolt for locating the hole intended to be drilled.

Another object of the present invention is to provide a novel drilling apparatus having a self locating and alignment means that will greatly reduce the cost of drilling a plurality of holes in a work piece and which greatly increases the efficiency of the drilling procedure.

Still another object of the present invention is to provide a novel drilling apparatus incorporating a self locating device and which is adapted to be received within the chuck of a power tool at one end thereof so as to form a unitary drilling assembly capable of powered rotation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the novel drilling apparatus of the present invention illustrated as being employed in a typical drilling procedure such as may be found at a construction site;

FIG. 2 is an enlarged transverse cross-sectional view of the drill apparatus shown in FIG. 1 and illustrating the drill bit at a desired location in accordance with registration of the alignment means with a selected foundation bolt;

FIG. 3 is a transverse cross-sectional view of the drilling apparatus shown in FIG. 2 as taken in the direction of arrows 3—3 thereof; and FIG. 4 is a fragmentary side elevational view of the end of the drilling apparatus as taken in the direction of arrows 4—4 of FIG. 2.

DESCRIPTION OF THE PREFERRED EMBODIMENT

Referring to FIG. 1, the drilling apparatus of the present invention is illustrated in the general direction of arrow 10 which may be said to include a power unit 11 having transverse hand grip 12 enclosing a switch mechanism 13 and which may include a conventional handle grip 14. On the opposite end of the housing from its end mounting grip 14, there is provided a conventional chuck 15 whereby the end of a drill bit may be releasably carried thereby. It is to be understood that the chuck 15 is encircled by a coupling 16 carrying an elongated outer sleeve 17 thereon. As illustrated, an extension 18 is carried on the outer aleeve 17 by means of a threaded connector 19. It is to be understood that the outer sleeve 17 may be of any suitable length and that the extension 18 is employed only as a modification when desired to extend the normal length of the outer sleeve.

In any event, the end of the outer sleeve from its end carried on coupling 16 is provided with an alignment means 20. The alignment means is carried on the extreme end of an inner sleeve 21 which extends upwardly within the confines of the outer sleeve 17 and in coaxial relationship therewith. The extreme end of the alignment means 20, which takes the form of a flat plate, is provided with a notch 22 adapted to be registered and indexed with a conventional foundation bolt 23. A plurality of foundation bolts 23 are incorporated into the foundation of a building which is illustrated immediately below the drilling apparatus 10. Such a foundation includes a foundation board or base 24 arranged in fixed spaced relationship with respect to the plurality of foundation bolt 23. In constructing the building, it is desired to provide a plurality of holes in the board 24 in alignment with each of the foundation bolts 23.

Therefore, the use of the present invention is shown in connection with originating holes, such as hole 25 in a form board 24 that is employed at a construction site in connection with the erection of a building structure. As illustrated, the apparatus 10 in FIG. 1 is poised in a position to originate hole 25. Rotation or turning of the drill bit is effected by means of actuation of trigger 13 carried on the power tool 11 which is coupled to a motor so that the turning of the drill bit may be selectively accomplished.

Referring now in detail to FIG. 2, it can be seen that the chuck 15 supports a drill bit having a shaft 30 which extends through the bore of inner sleeve 21 so as to terminate in an enlarged portion of inner sleeve 21 in the form of a fluted drilling head 31. The shank 30 rotates within the inner sleeve 21 and the inner sleeve is formed with an annular shoulder 32 against which the bottom of a resilient spring 33 presses while the opposite end of the spring presses against a bushing 34. The bushing 34 is fixed to the inside diameter of the outer sleeve 17 and the resilient spring forceably urges the inner sleeve 17 to extend outwardly from the drill bit 31. However, it is to be understood that the reciprocating movement of inner sleeve 21 is limited by the slot and pin arrangement as shown in FIG. 4. Slot 35 is formed on sleeve 21 constituting the inner sleeve while pin 36 is carried on the outer sleeve 18.

With respect to FIG. 2, it can be seen that the novel drilling apparatus of the present invention is self locating in that notch 22 on alignment plate 20 is placed in registry with the foundation bolt 23. Once this has been done, the drill bit 31 is located over the work piece 24 intended to be drilled so that the hole 25 will be properly located. Next, the power is applied to the drill bit via chuck 15 and shank 30 so that the drill rotates within the inner sleeve 21. Next, pressure is applied in a downward direction to the drill 11 which lowers both the outer sleeve 17 and 18 as well as the drill bit 31 into engagement with the form board 24. While the outer sleeve 17 and 18 is being lowered, the inner sleeve remains pressed against the form board 24 as the outer sleeve passes over it and the inner sleeve compresses spring 33. Downward movement of the drill bit 31 and outer sleeve 18 continues until the extreme end of outer sleeve 18 engages with the surface of alignment plate 20. At this point of engagement, continued downward movement of the drill is arrested. As the drill is raised upwardly, spring 33 will expand to cause relative movement between inner and outer sleeves in opposite directions until such time as pin 36 engages with the end of slot 35. Any wood chips that have been collected during the drilling procedure may exit through the plurality of holes 37 formed in the outer sleeve 18 as well as the inner sleeve 21.

Also, it is to be understood that the pins 36 and slot 35 are provided on opposite sides of the device and that the pins and slots are employed to keep the alignment plate 20 from turning and to control depth of drill. Depth is also controlled by engagement of the extreme end of outer sleeve 18 with the top of plate 20. However, depth may be made a sole control of the pin and slot arrangement, if desired.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a self locating drilling apparatus for locating the drilling site of a hole in a work piece with respect to a previously installed foundation bolt, the combination comprising:
a powered drill motor having a chuck mechanism rotatably mounted with respect to a fixed housing;
a drill having a fluted cutting drill end and a straight shank at its other end detachably carried and rotated by said chuck;
an outer sleeve fixedly carried on said housing and coaxial with respect to said drill;
an inner sleeve slidably mounted within said outer sleeve and disposed about said drill;
stop means cooperatively mounted between said outer and said inner sleeves for limiting sliding movement between said sleeves;
resilient means operably mounted between said sleeves normally urging said inner sleeve away from said outer sleeve whereby a predetermined length of said inner sleeve extends from and beyond said outer sleeve; and
alignment means secured to said inner sleeve length extending beyond said outer sleeve for registering with said foundation bolt whereby said drill starts said hold at a desired location.

2. The invention as defined in claim 1 wherein:
said stop means includes a slot formed in said inner sleeve and a pin carried in outer sleeve having a shank slidably engaged with said slot so as to abutt with the ends thereof to limit movement of said sleeves with respect to each other.

3. THe invention as defined in claim 2 wherein:
said alignment means includes an elongated plate having a flat undersurface for placement against the upper surface of said work piece and provided with a notch along its edge for engagement with said foundation bolt.

4. The invention as defined in claim 3 wherein:
said alignment plate is secured at one end to saidinner sleeve and its opposite end projects outwardly to terminate in said notched end.

5. The invention as defined in claim 4 wherein:
the adjacent ends of said pair of sleeves nearest to the alignment means include a plurality of chip holes for disposing of debris collected inside of said sleeves.

6. The invention as defined in claim 5 wherein:
said resilient means comprises a helical expansion spring abutting at one of its ends against a shoulder carried on said inner sleeve and abutting at its other end against a bushing secured to the inside diameter of said outer sleeve.

7. The invention as defined in claim 6 wherein:
said outer sleeve includes a pair of coaxial tubes having their opposing ends coupled together.

8. The invention as defined in claim 7 wherein:
said alignment plate is provided with a hole at its end opposite to said end carrying said notch and wherein said inner sleeve is secured to said plate so that its inner bore is coaxial with said hole.

* * * * *